United States Patent [19]
Greyzck

[11] Patent Number: 5,361,354
[45] Date of Patent: Nov. 1, 1994

[54] OPTIMIZATION OF ALTERNATE LOOP EXITS

[75] Inventor: Terry Greyzck, Eagan, Minn.

[73] Assignee: Cray Research, Inc., Eagan, Minn.

[21] Appl. No.: 809,390

[22] Filed: Dec. 17, 1991

[51] Int. Cl.$^5$ ............................................... G06F 9/45
[52] U.S. Cl. .................................. 395/700; 395/650; 395/375; 364/DIG. 1; 364/280.4
[58] Field of Search ....................... 395/650, 700, 375; 364/302

[56] References Cited

U.S. PATENT DOCUMENTS 4,398,249  8/1983  Pardo et al. .......................... 364/300
4,807,126  2/1989  Gotou et al. .......................... 395/700

OTHER PUBLICATIONS

Kennedy, Ken, *Automatic Translation Of Fortran Programs To Vector Form*, Oct. 1980, Department of Mathematical Sciences, Rice University, Houston, Tex., pp. 13–14.

*Primary Examiner*—Gareth D. Shaw
*Assistant Examiner*—A. Katbab
*Attorney, Agent, or Firm*—Schwegman, Lundberg & Woessner

[57] ABSTRACT

An optimization method to be carried out within a digital computer under programmed control for eliminating or removing from a loop body alternate exit tests substantially of the form $\alpha i + \beta \text{cond} \phi$, where $\alpha$, $\beta$ and $\phi$ are loop invariant expressions, i is the innermost loop index variable, and cond is one of the relational operators ($=, \neq, >, \geq, <, \leq$). Each alternate exit test is compared to a list of elimination conditions. If an alternate exit test matches one of the elimination conditions, it is eliminated entirely from the loop body. If the alternate exit test cannot be eliminated, it is then compared to a list of restriction conditions. If the alternate exit test matches one of the restriction conditions, the loop index upper bound is modified if necessary and the alternate exit test is moved from inside to outside of the loop body. The resulting altered loop body is near optimum in terms of both the storage area utilized and the program execution time.

21 Claims, 2 Drawing Sheets

OPTIMIZATION OF ALTERNATE LOOP EXITS

FIELD OF THE INVENTION

The present invention generally relates to programmed control in a digital computer for automatically evaluating high level language statements and compiling a set of machine executable instructions from them, and more particularly to an optimization method for eliminating or removing from a loop body alternate exit tests.

BACKGROUND OF THE INVENTION

Supercomputers are high performance computing platforms that employ a pipelined vector processing approach to solving numerical problems. Vectors are ordered sets of data. Problems that can be structured as a sequence of operations on vectors can experience one to two orders of magnitude increased throughput when executed on a vector machine (compared to execution on a scalar machine of the same cost). Pipelining further increases throughput by hiding memory latency through the prefetching of instructions and data.

A pipelined vector machine is disclosed in U.S. Pat. No. 4,128,880, issued Dec. 5, 1978, to Cray, the disclosure of which is hereby incorporated herein by reference. In the Cray machine, vectors are processed by loading them into operand vector registers, streaming them through a data processing pipeline having a functional unit, and receiving the output in a result vector register. A vector machine according to U.S. Pat. No. 4,128,880 supports fully parallel operation by allowing multiple pipelines to execute concurrently on independent streams of data.

For vectorizable problems, vector processing is faster and more efficient than scalar processing. Overhead associated with maintenance of the loop-control variable (for example, incrementing and checking the count) is reduced. In addition, central memory conflicts are reduced (fewer but bigger requests) and data processing units are used more efficiently (through data streaming).

Vector processing supercomputers are used for a variety of large-scale numerical problems. Applications typically are highly structured computations that model physical processes. They exhibit a heavy dependence on floating-point arithmetic due to the potentially large dynamic range of values within these computations. Problems requiring modeling of heat or fluid flow, or of the behavior of a plasma, are examples of such applications.

Program code for execution on vector processing supercomputers must be vectorized to exploit the performance advantages of vector processing. Vectorization typically breaks up a loop of the form:

```
FOR I IN 0 .. N LOOP
   X(I) = F{X(I), Y(I)};
END LOOP;
``` into a nested loop of the form:

```
FOR K IN 0 .. N BY VL LOOP
   FOR L IN 0 .. VL−1 LOOP
      X(K+L) = F{X(K+L), Y(K+L)};
   END LOOP;
END LOOP;
``` where VL is the length of the vector registers of the system. This process is known as "strip mining the loop". In strip mining, the number of iterations in the internal loop is defined by the length of a vector register. The number of iterations of the external loop is defined as an integer number of vector lengths. The remaining iterations are performed as a separate loop placed before the nested loop. Vector length arrays of data from the original data arrays are loaded into the vector registers for each iteration of the internal loop. Data from these vector registers can then be processed at the one or more elements per clock period rate of a vector operation.

Compilers exist that will automatically apply strip mining techniques to scalar loops within program code to create vectorized loops. This capability greatly simplifies programming efficient vector processing. The programmer simply enters code of the form:

```
FOR I IN 0 .. N LOOP
   X(I) = F{X(I), Y(I)};
END LOOP;
``` and it is vectorized.

There are, however, certain types of operations that inhibit the effectiveness of vectorization. One such operation is the automatic addition of alternate loop exits traditionally associated with array bounds checking. If array bounds checking is enabled, even relatively simple program source statements may generate a large number of alternate exit tests within a loop body because the upper and lower bounds must be checked for each array subscript contained in each program source statement. The presence of a large number of alternate exit tests greatly reduces the efficiency of the loop, and may cause a further loss of performance by preventing a compiler from vectorizing the loop. An equivalent loss of efficiency may also occur with scalar computers.

Therefore, there is a need for a method to remove or eliminate alternate exit tests from a loop body without changing the functionality of the loop.

SUMMARY OF THE INVENTION

The present invention provides an optimization method to be carried out within a digital computer under programmed control for eliminating or removing from a loop body alternate exit tests substantially of the form $\alpha i + \beta \, \text{cond} \, \phi$, where $\alpha$, $\beta$ and $\phi$ are loop invariant expressions, i is the innermost loop index variable, and cond is one of the relational operators ($=, \neq, >, \geq, <, \leq$). Each alternate exit test is compared to a list of elimination conditions. If an alternate exit test matches one of the elimination conditions, it is eliminated entirely from the loop body. If the alternate exit test cannot be eliminated, it is then compared to a list of restriction conditions. If the alternate exit test matches one of the restriction conditions, the loop index upper bound is modified if necessary and the alternate exit test is moved from inside to outside of the loop body. The resulting altered loop body is near optimum in terms of both the storage area utilized and the program execution time.

DETAILED DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

For the purposes of this description it is assumed that all division operations return results rounded down to the next lowest integer. In addition, all loops are assumed to be normalized by an earlier optimization. A normalized loop is a loop where the index variable runs from zero to some limit by an increment of one. All Fortran DO loops, Ada FOR loops, Pascal FOR loops, and a subset of C loops can be converted to this form, as well as some other restricted loop forms in these languages.

Figure 1:
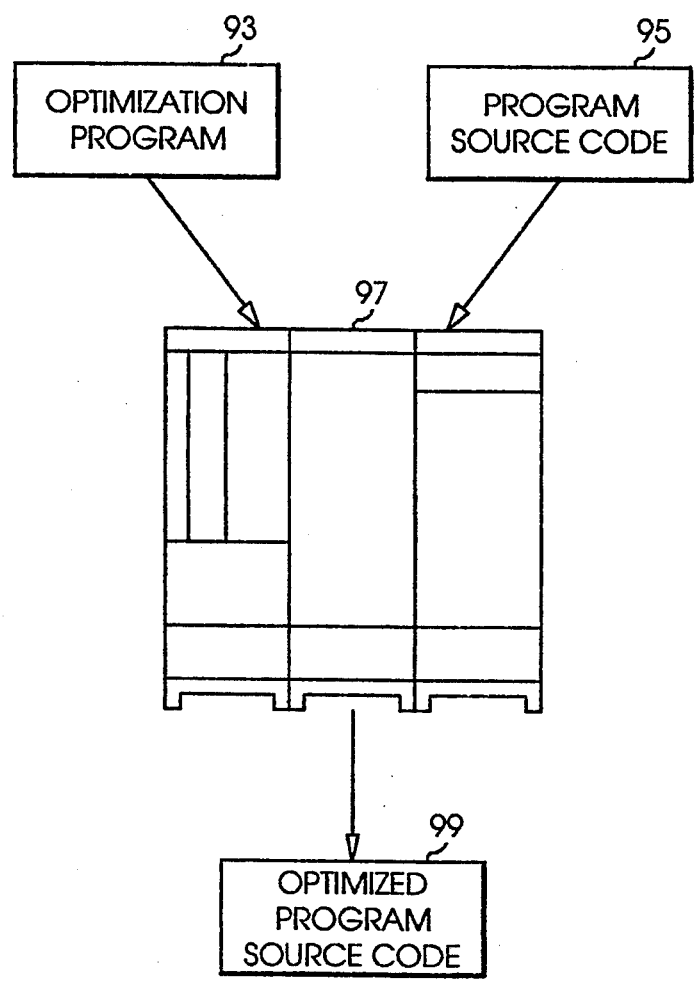
FIG. 1 is a diagram representing the system architecture which is compatible with the present invention.

FIG. 1 shows the system architecture used to eliminate or remove alternate exit tests from a loop body. A programmed computer 97 uses an optimization program 93 to evaluate program source code 95 and output an optimized program source code 99.

Figure 2:
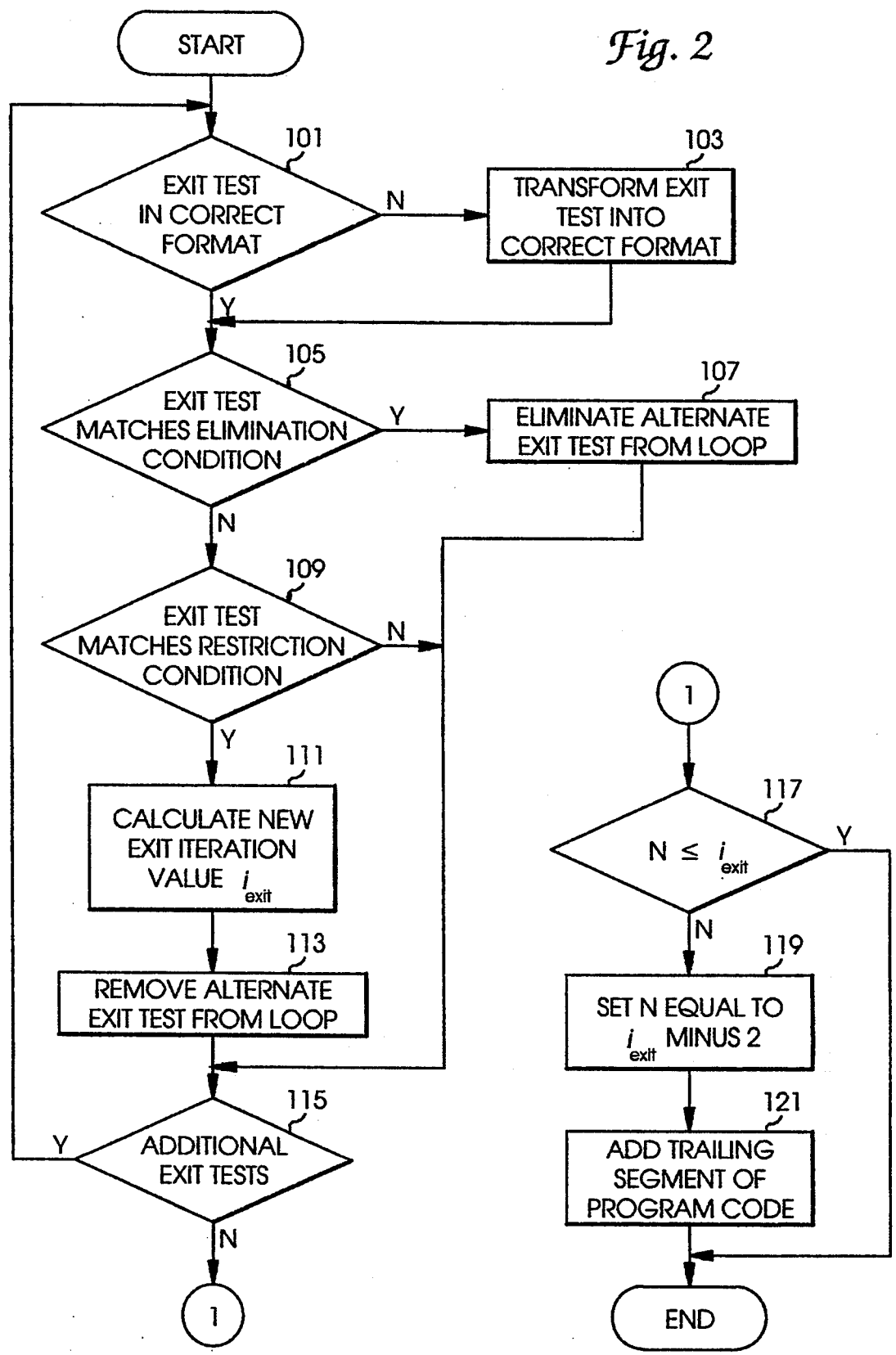
FIG. 2 is a general flow diagram representing the method and preferred computer program which is compatible with the present invention.

FIG. 2 illustrates the method and preferred computer program used to eliminate or remove alternate exit tests from a loop body. An alternate exit test is checked at 101 to see if it is of the form $\alpha i + \beta \, \text{cond} \, \phi$. If the alternate exit test is in the mirror image form $\phi \, \text{cond} \, \alpha i + \beta$, at 103 the alternate exit test is transformed into the form $\alpha i + \beta \, \text{cond} \, \phi$ by rotating the test around the condition and changing the test from $(=, \neq, >, \geq, <, \leq)$ to $(=, \neq, <, \leq, >, \geq)$, respectively. The alternate exit test may also be in formats other than the mirror image form so long as the format can be transformed into the form $\alpha i + \beta \, \text{cond} \, \phi$.

TABLE 1.

| Operation | Elimination Condition | Rule |
|---|---|---|
| = | $\alpha = 0, \beta - \phi \neq 0$ | 1.1 |
|   | $\alpha > 0, \beta - \phi > 0$ | 1.2 |
|   | $\alpha < 0, \beta - \phi < 0$ | 1.3 |
|   | $|\alpha| > 1, (\phi - \beta) \bmod \alpha \neq 0$ | 1.4 |
| $\neq$ | $\alpha = 0, \beta - \phi = 0$ | 1.5 |
| $<$ | $\alpha \geq 0, \beta - \phi \geq 0$ | 1.6 |
| $\leq$ | $\alpha \geq 0, \beta - \phi > 0$ | 1.7 |
| $>$ | $\alpha \leq 0, \beta - \phi \leq 0$ | 1.8 |
| $\geq$ | $\alpha \leq 0, \beta - \phi < 0$ | 1.9 |

At 105 the alternate exit test is compared to a list of elimination conditions given in Table 1. If the alternate exit test matches one of the elimination conditions, it is eliminated from the loop at 107.

TABLE 2.

| Operation | Restriction Cond. | Exit Expression | Rule |
|---|---|---|---|
| = | $\alpha = 0, \beta - \phi = 0$ | 1 | 2.1 |
|   | $\alpha = 0, (\phi - \beta) \bmod \alpha = 0$ | $(\phi - \beta)/\alpha + 1$ | 2.2 |
|   | $\alpha = 0, \beta - \phi \neq 0$ | $\infty$ | 2.3 |
|   | $\alpha = 0, (\phi - \beta) \bmod \alpha \neq 0$ | $\infty$ | 2.4 |
| $\neq$ | $\beta - \phi \neq 0$ | 1 | 2.5 |
|   | $\alpha \neq 0, \beta - \phi = 0$ | 2 | 2.6 |
|   | $\alpha = 0, \beta - \phi = 0$ | $\infty$ | 2.7 |
| $<$ | $\beta - \phi < 0$ | 1 | 2.8 |
|   | $\alpha < 0$ | $(\phi - \beta)/\alpha + 2$ | 2.9 |
|   | $\alpha \geq 0$ | $\infty$ | 2.10 |
| $\leq$ | $\beta - \phi \leq 0$ | 1 | 2.11 |
|   | $\alpha < 0$ | $(\phi - \beta - 1)/\alpha + 2$ | 2.12 |
|   | $\alpha \geq 0$ | $\infty$ | 2.13 |
| $>$ | $\beta - \phi > 0$ | 1 | 2.14 |
|   | $\alpha > 0$ | $(\phi - \beta)/\alpha + 2$ | 2.15 |
|   | $\alpha \leq 0$ | $\infty$ | 2.16 |
| $\geq$ | $\beta - \phi \geq 0$ | 1 | 2.17 |
|   | $\alpha > 0$ | $(\phi - \beta + 1)/\alpha + 2$ | 2.18 |
|   | $\alpha \leq 0$ | $\infty$ | 2.19 |

If at 105 the alternate exit test does not match one of the elimination conditions, it is compared at 109 to a list of restriction conditions given in Table 2. If the alternate exit test matches one of the restriction conditions, a new loop exit iteration value $i_{exit}$ is calculated at 111 according to a list of exit expression rules given in Table 2, and the alternate exit test is eliminated from the loop at 113.

In an alternative embodiment, the elimination and/or restriction conditions may be transformed at 103 into the same form as the alternate exit test that is being evaluated.

If at 115 there are additional alternate exit tests to be evaluated, control returns to 101. If at 115 there are no additional alternate exit tests to be evaluated, the value of an existing loop exit upper bounds expression N is compared at 117 to the new loop exit iteration value $i_{exit}$. If the value of N is less than or equal to $i_{exit}$, at 119 the value of N is set to $i_{exit}$ minus two, and at 121 a trailing segment of program code is added after the loop body if necessary.

If the loop has constant upper bounds and the value of N is less than or equal to $i_{exit}$, then none of the evaluated alternate exit tests can be true and therefore it not necessary to add a trailing segment of program code. If the loop has constant upper bounds and the value of N is greater than $i_{exit}$, then an alternate exit test will always be true before the loop would terminate normally. The loop is modified to run from zero to $i_{exit}$ minus two, and a trailing segment of program code comprising one iteration from the start of the loop down to the alternate exit test that was true and error handling program code are inserted after the loop body. If the loop has an unknown upper bounds, the loop is modified to run from zero to min($i_{exit}$ minus two, N), computed at run time, and a trailing segment of program code comprising one iteration from the start of the loop down to the alternate exit test that was true and error handling program code are inserted after the loop body. A conditional test is placed around the trailing segment of program code so that the trailing segment of program code will only be executed when the value of N is greater than $i_{exit}$. In both cases, the trailing segment of program code calculates the final partial iteration of the loop before error handling program code is executed.

BOUNDS CHECKING EXAMPLE

The following example program code fragment comprises a loop to be optimized:

Define: A(0..479), B(−20..500), C(1..500), D(−2..453)
FOR I IN 0..N LOOP
    A(I+1) := A(I)+B(I);
    C(173-I) := A(I)−1;

-continued
```
    D(I*2) := C(350−I*2);
END LOOP;
```

With bounds checking for each subscript, the loop would typically be converted internally to:

```
Define: A(0..479), B(−20..500), C(1..500), D(−2..453)
    FOR I IN 0..N LOOP
a:      IF I < GOTO OB;              --Check A(I) lower bounds
b:      IF I > 479 GOTO OB;          --Check A(I) upper bounds
c:      IF I < −20 GOTO OB;          --Check B(I) lower bounds
d:      IF I > 500 GOTO OB;          --Check B(I) upper bounds
e:      IF I+1 < GOTO OB;            --Check A(I+1) lower bounds
f:      IF I+1 > 479 GOTO OB;        --Check A(I +1) upper bounds
        A(I+1) := A(I)+B(I);
g:      IF I > GOTO OB;              --Check A(I) lower bounds
h:      IF I > 479 GOTO OB;          --Check A(I) upper bounds
i:      IF 173−I > 1 GOTO OB;        --Check C(173−I) lower bounds
j:      IF 173−I > 500 GOTO OB;      --Check C(173−I) upper bounds
        C(173−I) := A(I)−1;
k:      IF 350−I*2 < 1 GOTO OB;       --Check C(350−I*2) lower
l       IF 350−I*2 > 500 GOTO OB;     --Check C(350−I*2) upper
m:      IF I*2 < −2 GOTO OB;         --Check D(I*2) lower bounds
n:      IF I*2 > 453 GOTO OB;        --Check D(I*2) upper bounds
        D(I*2) := C(350−I*2);
    END LOOP;
OB: --Out of bounds error exit code
```

As this example illustrates, a small amount of program code may generate a large number of alternate exit tests when bounds checking is made active. Each of the alternate exit tests is evaluated in turn to see if it may be eliminated or removed from the loop body.

Test 'a': $\alpha$ is 1, $\beta$ is 0, $\phi$ is 0, and the condition is $<$. Rule 1.6 evaluates true, so the test can be eliminated outright (it can never be true).

Test 'b': $\alpha$ is 1, $\beta$ is 0, $\phi$ is 479, and the condition is $>$. Rules 1.1 through 1.9 do not apply, so further evaluation is necessary. Rule 2.14 is not applicable, so rule 2.15 is used to compute $i_{exit}$ equals (479-0)/1+2, or 481. The test will be true on iteration 481 (when I=480). This information is stored temporarily.

Test 'c': $\alpha$ is 1, $\beta$ is 0, $\phi$ is −20, and the condition is $<$. Rule 1.6 allows this test to be eliminated.

Test 'd': $\alpha$ is 1, $\beta$ is 0, $\phi$ is 500, and the condition is $>$. Rule 2.15 is used to compute $i_{exit}$ equals (500-0)/1+2, or 502. The test will be true on iteration 502. This information is stored temporarily, but note that test 'b' will exit the loop before this test, on iteration 481.

Test 'e': $\alpha$ is 1, $\beta$ is 1, $\phi$ is 0, and the condition is $<$. Rule 1.6 allows this test to be eliminated.

Test 'f': $\alpha$ is 1, $\beta$ is 1, $\phi$ is 479, and the condition is $>$. Rule 2.15 is used to compute $i_{exit}$ equals (479-1)/1+2, or 480. Note that this is one iteration earlier than test 'b'. This information is stored temporarily.

Test 'g': This evaluates identically to test 'a', and is eliminated.

Test 'h': This evaluates identically to test 'b', and will cause an exit on iteration 481. This information is stored temporarily.

Test 'i': $\alpha$ is −1, $\beta$ is 173, $\phi$ is 1, and the condition is $<$. Rule 1.6 does not apply, rule 2.8 evaluates false, so rule 2.9 is used to compute $i_{exit}$ equals (1-173)/(−1)+2, or 174. This information is stored temporarily.

Test 'j': $\alpha$ is −1, $\beta$ is 173, $\phi$ is 500, and the condition is $>$. Rule 1.8 allows this test to be eliminated.

Test 'k': $\alpha$ is −2, $\oplus$ is 350, $\phi$ is 1, and the condition is $<$. Rule 2.9 is used to compute $i_{exit}$ equals (1-350)/(−2)+2, or 176 (division operations are rounded down). This information is stored temporarily.

Test 'l': $\alpha$ is −2, $\beta$ is 350, $\phi$ is 500, and the condition is $>$. Rule 1.8 allows this test to be eliminated.

Test 'm': $\alpha$ is 2, $\beta$ is 0, $\phi$ is −2, and the condition is $<$. Rule 1.6 allows this test to be eliminated.

Test 'n': $\alpha$ is 2, $\beta$ is 0, $\phi$ is 453, and the condition is $>$. Rule 2.15 is used to compute $i_{exit}$ equals (453-0)/2+2, or 228. This information is stored temporarily.

Of the fourteen generated alternate exit tests, seven have been eliminated outright. The first iteration in which the loop will exit is determined by finding the lowest of all the $i_{exit}$ values, min(481, 502, 480, 481, 174, 176, 228), or iteration 174, which corresponds to test 'i'.

If the value of the existing loop exit upper bounds expression N is larger than 172, then the abnormal exit would be taken. After a trailing segment of program code comprising an appropriate test and one iteration from the start of the loop down to test 'i' are inserted after the loop body, the rewritten loop is:

```
FOR I IN 0..MIN(172,N) LOOP
    A(I+1) := A(I)+B(I);
    C(173−I) := A(I)−1;
    D(I*2) := C(350−I*2);
END LOOP;
IF N > 172 THEN
    A(173+1) := A(173+B(173);
    GOTO OB;
END IF;
OB: --Out of bounds error exit code
```

PERFORMANCE ANALYSIS

Given that each statement of the loop without bounds checking takes $\lambda$ time, each bounds test takes $\Delta$ time, and the loop executes for 172 iterations (plus one partial iteration), then execution time t is:

$$t_{unoptimized} = (3\lambda + 14\Delta) \times 172 + \lambda + 6\Delta$$

or, $$t_{optimized} = (3\lambda) \times 172 + \lambda + 3\Delta$$

$$t_{unoptimized} = 517\lambda + 2414\Delta, \text{ and}$$
$$t_{optimized} = 517\lambda + 3\Delta.$$

The amount of overhead required to provide bounds checking has been reduced by 99.88% [(2414-3)/2414], and if a $\Delta$ executes in half the time of a $\lambda$, then the loop execution time is reduced by approximately 70%. In addition, further performance improvements may arise because the removal of the alternate exit tests from the loop allows for improved scalar and vector optimizations by other methods.

The present invention is to be limited only in accordance with the scope of the appended claims, since others skilled in the art may devise other embodiments still within the limits of the claims. The method of optimization described herein may also be applied without loss of generality to scalar or other types of computers.

What is claimed is:

1. A digital computer for eliminating, under programmed control, alternate exit tests from a loop body, the programmed computer comprising:
   (a) transformation means for transforming an alternate exit test into a transformed alternate exit test of the form $\alpha i + \beta \text{cond} \phi$, where $\alpha$, $\beta$ and $\phi$ are loop invariant expressions, i is the innermost loop index variable, and cond is one of the relational operators $(=, \neq, >, \geq, <, \leq)$;
   (b) comparison means for comparing the transformed alternate exit test to a list of elimination conditions; and
   (c) elimination means for eliminating the alternate exit test from the loop body if it matches one of the elimination conditions; whereby an optimized loop body is produced.

2. The programmed computer of claim 1 wherein the list of elimination conditions comprises:
   (a) where the operator is "=", $\alpha=0$, and $\beta-\phi\neq 0$;
   (b) where the operator is "=", $\alpha>0$, and $\beta-\phi>0$;
   (c) where the operator is "=", $\alpha<0$, and $\beta-\phi<0$;
   (d) where the operator is "=", $|\alpha|>1$, and $(\phi-\beta)\text{mod}\alpha\neq 0$;
   (e) where the operator is "$\neq$", $\alpha=0$, and $\beta-\phi=0$;
   (f) where the operator is "<", $\alpha\geq 0$, and $\beta-\phi\geq 0$;
   (g) where the operator is "$\leq$", $\alpha\geq 0$, and $\beta-\phi>0$;
   (h) where the operator is ">", $\alpha\leq 0$, and $\beta-\phi\leq 0$; and
   (i) where the operator is "$\geq$", $\alpha\leq 0$, and $\beta-\phi<0$.

3. The programmed computer of claim 1 further comprising insertion means for inserting program code before the loop body for calculating the value of each loop invariant expression $\alpha$, $\beta$ or $\phi$ that is a variable expression.

4. A digital computer for removing, under programmed control, alternate exit tests from a loop body, the programmed computer comprising:
   (a) transformation means for transforming an alternate exit test into a transformed alternate exit test of the form $\alpha i + \beta \text{cond} \phi$, where $\alpha$, $\beta$ and $\phi$ are loop invariant expressions, i is the innermost loop index variable, and cond is one of the relational operators $(=, \neq, >, \geq, <, \leq)$;
   (b) comparison means for comparing the transformed alternate exit test to a list of restriction conditions; and
   (c) calculation means for calculating a new loop exit iteration value $i_{exit}$ according to a list of exit expression rules if the transformed alternate exit test matches one of the restriction conditions;
   (d) removal means for removing the alternate exit test from the loop body if the transformed alternate exit test matches one of the restriction conditions;
   (e) comparison means for comparing the value of an existing loop exit upper bounds expression N to $i_{exit}$ if N is a constant expression;
   (f) modification means for modifying the value of N to be substantially equal to $i_{exit}$ minus two if N is a constant expression and the value of N is greater than $i_{exit}$; and
   (g) trailing segment insertion means for inserting a first trailing segment of program code after the loop body if N is a constant expression and the value of N is greater than $i_{exit}$, whereby an optimized loop body is produced.

5. The programmed computer of claim 4 wherein the list of restriction conditions comprises:
   (a) if operator is "=", $\alpha=0$, and $\beta-\phi=0$;
   (b) if operator is "=", $\alpha\neq 0$, and $(\phi-\beta)\text{mod}\alpha=0$;
   (c) if operator is "=", $\alpha=0$, and $\beta-\phi\neq 0$;
   (d) if operator is "=", $\alpha\neq 0$, and $(\phi-\beta)\text{mod}\alpha\neq 0$;
   (e) if operator is "$\neq$" and $\beta-\phi\neq 0$;
   (f) if operator is "$\neq$", $\alpha\neq 0$, and $\beta-\phi=0$;
   (g) if operator is "$\neq$", $\alpha=0$, and $\beta-\phi=0$;
   (h) if operator is "<" and $\beta-\phi<0$;
   (i) if operator is "<" and $\alpha<0$;
   (j) if operator is "<" and $\alpha\geq 0$;
   (k) if operator is "$\leq$" and $\beta-\phi\leq 0$;
   (l) if operator is "$\leq$" and $\alpha<0$;
   (m) if operator is "$\leq$" and $\alpha\geq 0$;
   (n) if operator is ">" and $\beta-\phi>0$;
   (o) if operator is ">" and $\alpha>0$;
   (p) if operator is ">" and $\alpha\leq 0$;
   (q) if operator is "$\geq$" and $\beta-\phi\geq 0$;
   (r) if operator is "$\geq$" and $\alpha>0$; and
   (s) if operator is "$\geq$" and $\alpha\leq 0$.

6. The programmed computer of claim 4 wherein the list of exit expression rules comprises:
   (a) if operator is "=", $\alpha=0$, and $\beta-\phi=0$, then $i_{exit}=1$;
   (b) if operator is "=", $\alpha\neq 0$, and $(\phi-\beta)\text{mod}\alpha=0$, then $i_{exit}=(\phi-\beta)/\alpha+1$;
   (c) if operator is "=", $\alpha=0$, and $\beta-\phi\neq 0$, then $i_{exit}=\infty$;
   (d) if operator is "=", $\alpha\neq 0$, and $(\phi-\beta)\text{mod}\alpha\neq 0$, then $i_{exit}=\infty$;
   (e) if operator is "$\neq$" and $\beta-\phi\neq 0$, then $i_{exit}=1$;
   (f) if operator is "$\neq$", $\alpha\neq 0$, and $\beta-\phi=0$, then $i_{exit}=2$;
   (g) if operator is "$\neq$", $\alpha=0$, and $\beta-\phi=0$, then $i_{exit}=\infty$;
   (h) if operator is "<" and $\beta-\phi<0$, then $i_{exit}=1$;
   (i) if operator is "<" and $\alpha<0$, then $i_{exit}=(\phi-\beta)/\alpha+2$;
   (j) if operator is "<" and $\alpha\geq 0$, then $i_{exit}=\infty$;
   (k) if operator is "$\leq$" and $\beta-\phi\leq 0$, then $i_{exit}=1$;
   (l) if operator is "$\leq$" and $\alpha<0$, then $i_{exit}=(\phi-\beta-1)/\alpha+2$;
   (m) if operator is "$\leq$" and $\alpha\geq 0$, then $i_{exit}=\infty$;
   (n) if operator is ">" and $\beta-\phi>0$, then $i_{exit}=1$;
   (o) if operator is ">" and $\alpha>0$, then $i_{exit}=(\phi-\beta)/\alpha+2$;
   (p) if operator is ">" and $\alpha\leq 0$, then $i_{exit}=\infty$;
   (q) if operator is "$\geq$" and $\beta-\phi\geq 0$, then $i_{exit}=1$;
   (r) if operator is "$\geq$" and $\alpha>0$, then $i_{exit}=(\phi-\beta+1)/\alpha+2$; and
   (s) if operator is "$\geq$" and $\alpha\leq 0$, then $i_{exit}=\infty$.

7. The programmed computer of claim 4 further comprising invariant expression evaluation insertion means for inserting before the loop body program code for calculating the value of each loop invariant expression α, β or φ that is a variable expression.

8. The programmed computer of claim 4 further comprising modification means for modifying the value the existing loop exit upper bounds expression N to be equal to the minimum value of either $i_{exit}$ minus two or the value of N if N is a variable expression.

9. The programmed computer of claim 4 wherein the trailing segment of program code comprises a final partial loop iteration calculation and error handling program code.

10. The programmed computer of claim 4 wherein the trailing segment insertion means comprises means for inserting a second trailing segment of program code after the loop body if N is a variable expression.

11. The programmed computer of claim 10 wherein the second trailing segment of program code comprises a test, a final partial loop iteration calculation, and error handling program code.

12. An optimization method to be carried out within a digital computer under programmed control for eliminating alternate exit tests from a loop body, the method comprising the steps of:
(a) transforming an alternate exit test into a transformed alternate exit test of the form $\alpha i + \beta \text{cond} \phi$, where α, β and φ are loop invariant expressions, i is the innermost loop index variable, and cond is one of the relational operators $(=, \neq, >, \geq, <, \leq)$;
(b) comparing the transformed alternate exit test to a list of elimination conditions; and
(c) eliminating the alternate exit test from the loop body if the transformed alternate exit test matches one of the elimination conditions, whereby an optimized loop body is produced.

13. The optimization method of claim 12 wherein the list of elimination conditions comprises:
(a) where the operator is "=", $\alpha=0$, and $\beta-\phi\neq 0$;
(b) where the operator is "=", $\alpha>0$, and $\beta-\phi>0$;
(c) where the operator is "=", $\alpha<0$, and $\beta-\phi<0$;
(d) where the operator is "=", $|\alpha|>1$, and $(\phi-\beta)\text{mod}\alpha\neq 0$;
(e) where the operator is "≠", $\alpha=0$, and $\beta-\phi=0$;
(f) where the operator is "<", $\alpha\geq 0$, and $\beta=\phi\geq 0$;
(g) where the operator is "≤", $\alpha\geq 0$, and $\beta-\phi\geq 0$;
(h) where the operator is ">", $\alpha\leq 0$, and $\beta-\phi\leq 0$; and
(i) where the operator is "≥", $\alpha\leq 0$, and $\beta-\phi<0$.

14. The optimization method of claim 12 wherein the method further comprises inserting before the loop body program code for calculating the value of each loop invariant expression α, β or φ that is a variable expression.

15. An optimization method to be carried out within a digital computer under programmed control for removing alternate exit tests from a loop body, the method comprising the steps of:
(a) transforming an alternate exit test into a transformed alternate exit test of the form $\alpha i + \beta \text{cond} \phi$, where α, β and φ are loop invariant expressions, i is the innermost loop index variable, and cond is one of the relational operators $(=, \neq, >, \geq, <, \leq)$;
(b) comparing the transformed alternate exit test to a list of restriction conditions;
(c) calculating a new loop exit iteration value $i_{exit}$ according to a list of exit expression rules if the transformed alternate exit test matches one of the restriction conditions;
(d) removing the alternate exit test from the loop body if the transformed alternate exit test matches one of the restriction conditions;
(e) comparing the value of an existing loop exit upper bounds expression N to the new loop exit iteration value $i_{exit}$;
(f) modifying the value of N to be substantially equal to $i_{exit}$ minus two if N is a constant expression and the value of N is greater than $i_{exit}$; and
(g) inserting a trailing segment of program code after the loop body if N is a constant expression and the value of N is greater than $i_{exit}$, whereby an optimized loop body is produced.

16. The optimization method of claim 15 wherein the list of restriction conditions comprises:
(a) if operator is "=", $\alpha=0$, and $\beta-\phi=0$;
(b) if operator is "=", $\alpha\neq 0$, and $(\phi-\beta)\text{mod}\alpha=0$;
(c) if operator is "=", $\alpha=0$, and $\beta-\phi\neq 0$;
(d) if operator is "=", $\alpha\neq 0$, and $(\phi-\beta)\text{mod}\alpha\neq 0$;
(e) if operator is "≠" and $\beta=\phi\neq 0$;
(f) if operator is "≠", $\alpha\neq 0$, and $\beta-\phi=0$;
(g) if operator is "≠", $\alpha=0$, and $\beta-\phi=0$;
(h) if operator is "<" and $\beta-\phi<0$;
(i) if operator is "<" and $\alpha<0$;
(j) if operator is "<" and $\alpha\geq 0$;
(k) if operator is "≤" and $\beta-\phi\leq 0$;
(l) if operator is "≤" and $\alpha<0$;
(m) if operator is "≤" and $\alpha\geq 0$;
(n) if operator is ">" and $\beta-\phi>0$;
(o) if operator is ">" and $\alpha>0$;
(p) if operator is ">" and $\alpha\leq 0$;
(q) if operator is "≥" and $\beta-\phi\geq 0$;
(r) if operator is "≥" and $\alpha>0$; and
(s) if operator is "≥" and $\alpha\leq 0$.

17. The optimization method of claim 15 wherein the list of exit expression rules comprises:
(a) if operator is "=", $\alpha=0$, and $\beta-\phi=0$, then $i_{exit}=1$;
(b) if operator is "=", $\alpha\neq 0$, and $(\phi-\beta)\text{mod}\alpha=0$, then $i_{exit}=(\phi-\beta)/\alpha+1$;
(c) if operator is "=", $\alpha=0$, and $\beta-\phi\neq 0$, then $i_{exit}=\infty$;
(d) if operator is "=", $\alpha\neq 0$, and $(\phi-\beta)\text{mod}\alpha\neq 0$, then $i_{exit}=\infty$;
(e) if operator is "≠" and $\beta-\phi\neq 0$, then $i_{exit}=1$;
(f) if operator is "≠", $\alpha\neq 0$, and $\beta-\phi=0$, then $i_{exit}=2$;
(g) if operator is "≠", $\alpha=0$, and $\beta-\phi=0$, then $i_{exit}=\infty$;
(h) if operator is "<" and $\beta-\phi<0$, then $i_{exit}=1$;
(i) if operator is "<" and $\alpha<0$, then $i_{exit}=(\phi-\beta)/\alpha+2$;
(j) if operator is "<" and $\alpha\geq 0$, then $i_{exit}=\infty$;
(k) if operator is "≤" and $\beta-\phi\leq 0$, then $i_{exit}=1$;
(l) if operator is "≤" and $\alpha<0$, then $i_{exit}=(\phi-\beta-1)/\alpha+2$;
(m) if operator is "≤" and $\alpha\geq 0$, then $i_{exit}=\infty$;
(n) if operator is ">" and $\beta-\phi>0$, then $i_{exit}=1$;
(o) if operator is ">" and $\alpha>0$, then $i_{exit}=(\phi-\beta)/\alpha+2$;
(p) if operator is ">" and $\alpha\leq 0$, then $i_{exit}=\infty$;
(q) if operator is "≥" and $\beta-\phi\geq 0$, then $i_{exit}=1$;
(r) if operator is "≥" and $\alpha>0$, then $i_{exit}=(\phi-\beta+1)/\alpha+2$; and
(s) if operator is "≥" and $\alpha\leq 0$, then $i_{exit}=\infty$.

18. The optimization method of claim 15 wherein the method further comprises inserting before the loop body program code for calculating the value of each loop invariant expression $\alpha$, $\beta$ or $\phi$ that is a variable expression.

19. The optimization method of claim 18 wherein, if N is a variable expression, the method further comprises the step of modifying the value of the existing loop exit upper bounds expression N to be equal to the minimum value of either $i_{exit}$ minus two or the value of N.

20. The optimization method of claim 19 wherein the step of modifying comprises inserting a trailing segment of program code after the loop body.

21. The optimization method of claim 20 wherein the trailing segment of program code comprises a test, a final partial loop iteration calculation, and error handling program code.

* * * * *

UNITED STATES PATENT AND TRADEMARK OFFICE
CERTIFICATE OF CORRECTION

PATENT NO. : 5,361,354

DATED : November 1, 1994

INVENTOR(S) : Terry Greyzck

It is certified that error appears in the above-identified patent and that said Letters Patent is hereby corrected as shown below:

At Col. 3, line 62, please delete "a=0," and insert --a≠0,--.

At Col. 3, line 64, please delete "a=0," and insert --a≠0,--.

At Col. 5, Table, line "a", please delete "IF I < GOTO OB;" and insert --IF I < 0 GOTO OB;--.

At Col. 5, Table, line "e", please delete "IF I + 1 < GOTO OB;" and insert --IF I + 1 < 0 GOTO OB;--.

At Col. 5, Table, line "g", please delete "IF I > GOTO OB;" and insert --IF I < 0 GOTO OB;--.

At Col. 5, Table, line "i", please delete "if 173-I > 1 GOTO OB;" please insert --IF 173-I < 1 GOTO OB;--.

At Col. 5, line 67, please delete "α is -2, ⊕ is 350" and insert --α is -2, β is 350--.

At Col. 8, line 40, please delete "them" and insert --then--.

UNITED STATES PATENT AND TRADEMARK OFFICE
CERTIFICATE OF CORRECTION

PATENT NO. : 5,361,354

DATED : November 1, 1994

INVENTOR(S) : Terry Greyzck

It is certified that error appears in the above-identified patent and that said Letters Patent is hereby corrected as shown below:

At Col. 9, line 45, please delete "$\beta\text{-}\varnothing \geq 0;$" and insert "$\beta\text{-}\varnothing > 0;$--.

At Col. 10, line 20, please delete "$\beta = \varnothing \neq 0;$" and insert --$\beta\text{-}\varnothing \neq 0;$--.

At Col. 10, line 41, please delete "them" and insert --then--.

At Col. 11, line 4, please delete "claim 18" and insert --claim 15--.

Signed and Sealed this

Thirtieth Day of December, 1997

*Attest:*

BRUCE LEHMAN

*Attesting Officer*  *Commissioner of Patents and Trademarks*